Dec. 3, 1963     O. K. MOORE ETAL     3,112,569
EDUCATIONAL APPARATUS FOR CHILDREN
Filed May 29, 1961     4 Sheets-Sheet 1
FIG. 1
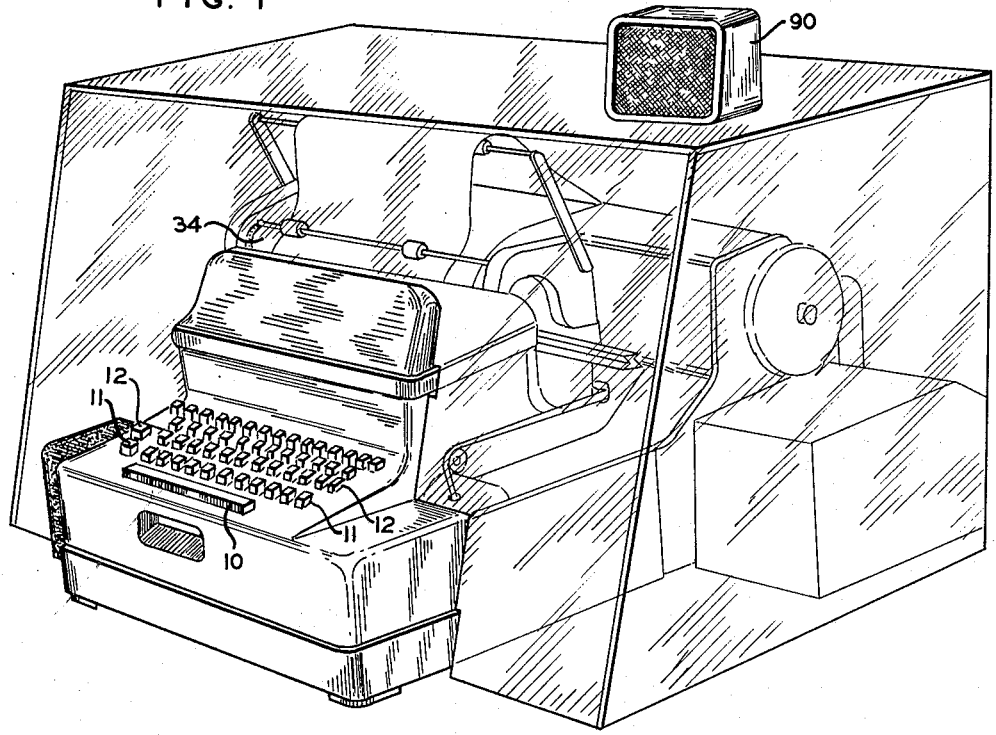
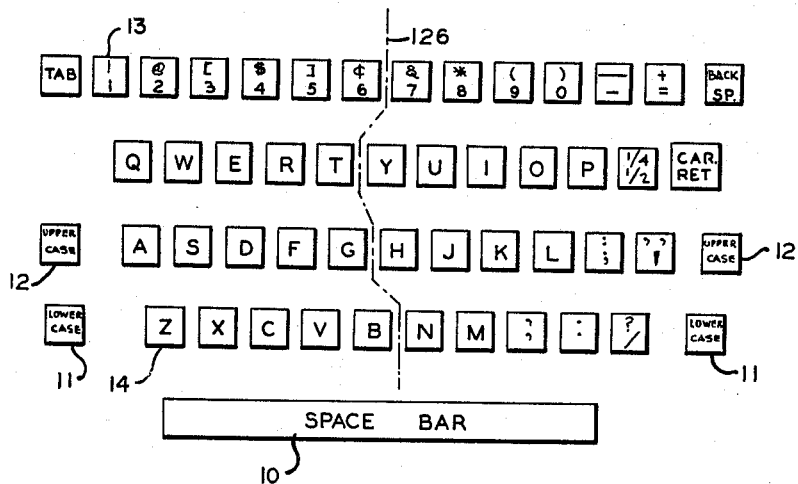
FIG. 3
INVENTORS
OMAR K. MOORE
RICHARD KOBLER
BY
George H. Fritzinger
AGENT INVENTORS
OMAR K. MOORE
RICHARD KOBLER
BY George H. Fritzinger
AGENT

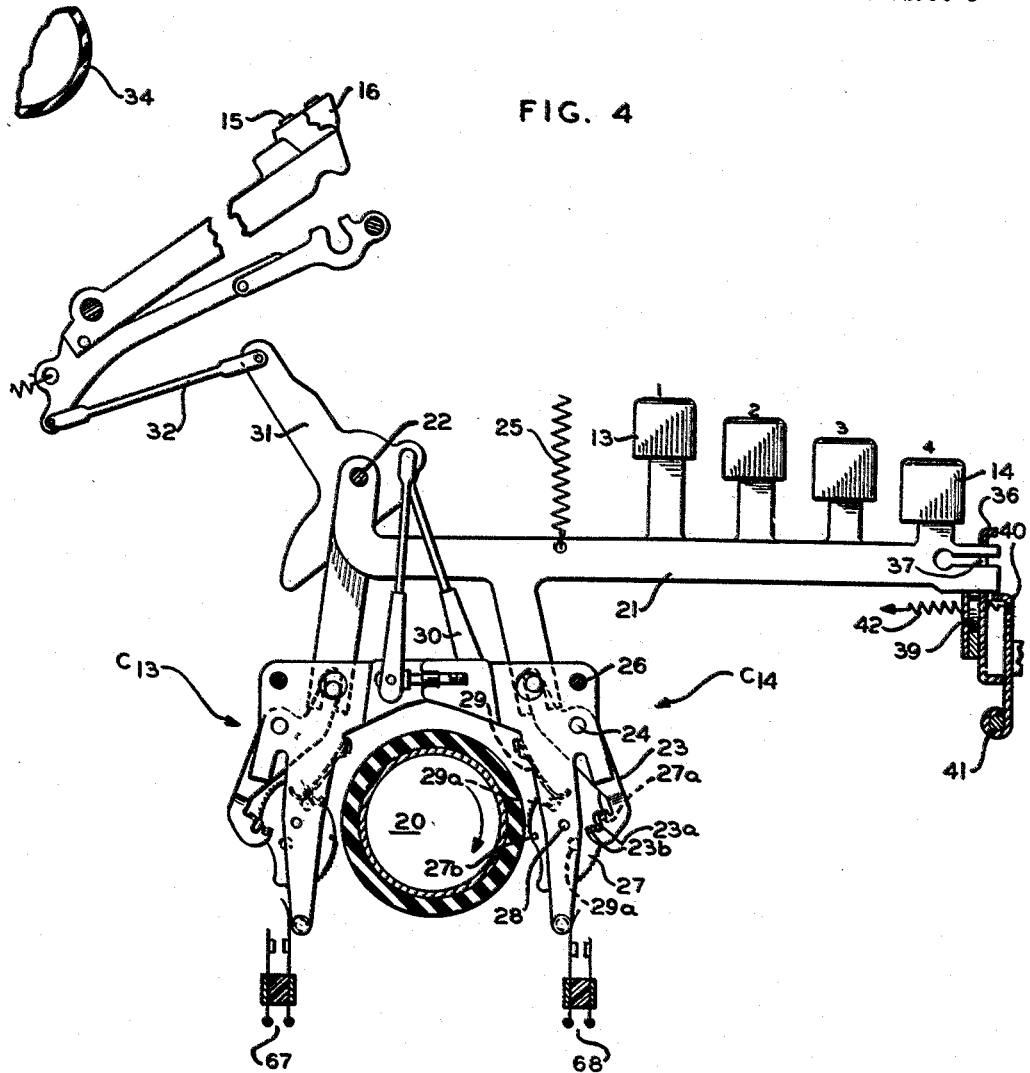

Dec. 3, 1963 O. K. MOORE ETAL 3,112,569
EDUCATIONAL APPARATUS FOR CHILDREN
Filed May 29, 1961 4 Sheets-Sheet 4

INVENTORS
OMAR K. MOORE
RICHARD KOBLER
BY
George H. Fritzinger
AGENT

United States Patent Office 3,112,569
Patented Dec. 3, 1963

3,112,569
EDUCATIONAL APPARATUS FOR CHILDREN
Omar K. Moore, Guilford, Conn., and Richard Kobler, West Orange, N.J., assignors to McGraw-Edison Company, Elgin, Ill., a corporation of Delaware
Filed May 29, 1961, Ser. No. 113,420
13 Claims. (Cl. 35—5)

This invention relates to an educational apparatus adapted to serve as a self-training aid for children to enable a child to develop his basic faculties to an unusually high degree at a very early age. The invention relates especially to an educational system and apparatus for aiding children, especially from three to five years of age, to utilize the acute and uninhibited perception which they have at this age level to speed up their learning processes.

The basic training system facilitated by the invention is that wherein a child is exposed to an environment which will stimulate him to perform some selective operation or manipulation utilizing one or more of his senses, and wherein a related sensory aspect of the thing selected or done is fed back to the child in response to that selected operation or manipulation. This enables the child to correlate the different sensory aspects of the thing selected or done in a very short time. As a result the child's learning and memory processes are speeded up to a phenomenal rate and the child achieves an unusually high development of his faculties at a very early age.

An object of the invention is to provide an educational apparatus which will stimulate and guide a child to learn to read letters, characters and words, and to spell, type, print and take dictation at an early age by a self-tutoring process.

The appaartus in accordance with the invention is of the keyboard type comprising a specially constructed typewriter provided with safeguarding means to enable only one key to be depressed at a time and to enable a successive key to be pressed only after the child has performed a related act and/or received a response to the character selected. The typewriter is specially constructed and arranged to induce the child to learn the correct manipulation of the keyboard. Coupled to the typewriter is a reproducing machine which pronounces each selected character responsive to depressing the respective key. Through an adjustable timing means the automatic pronunciation of the character can be delayed for any desired interval according to the particular needs of the child to give the child time to attempt a self pronunciation of the selected character before the automatic pronunciation is given. The automatic pronunciation following such attempted self pronunication then serves to bring immediately to the child's attention any error or defect in his own pronunciation. The printing of a character responsive to depressing a respective key followed by the child's attempted pronunciation and the subsequent correct automatic pronunication gives the child, visual, oral and auditory impressions of each selected character to speed up the child's learning and memory processes. Furthermore, the requirement that the child perform a selected manipulation on the keyboard to initiate each visual, oral and auditory aspect of the selected character coordinates the child's dexterity and develops rapidly his ability to operate the keyboard.

An object of the invention is to provide a self-training apparatus and system for children which performs automatically the needed responsive functions to the actions initiated by the child. In another sense it is an object to provide an instrument responsive to the environment created by a child to enable a child to learn to read, speak, spell, print and type at an early age.

Another object is to provide a specially constructed typewriter in combination with a sound reproducing machine which pronounces automatically each selected character responsive to each depression of the respective key of the keyboard of the typewriter.

Another object is to lock the keyboard after each depression of a key thereof until the automatic pronunciation of the selected character is completed.

Another object is to provide the typewriter with an adjustable means by which the automatic pronunciation of each selected character can be delayed by a suitable period after the respective key is depressed.

Another object is to provide the specially constructed typewriter with a jam-proof keyboard to assure foolproof operation thereof.

Another object is to provide the typewriter with means for fading out the volume of the automatic pronunciation of the selected characters.

Another object is to provide the typewriter with means for automatically pronouncing the selected characters and for locking the keyboard until the automatic pronunication is completed irrespective of whether a key is only partially or fully depressed.

Another object is to provide for only a single activation of a type bar and a single pronunciation of the selected character when a key is depressed regardless of whether the key is depressed only partially or fully and regardless of how long the depressed key is held in its operated position.

A still further object is to provide the typewriter with special features to enable the child to learn the correct manipulation of the keyboard without outside help.

Other objects and features of the invention will be apparent from the following description and the appended claims.

In the description of the invention reference is had to the accompanying drawings, of which:

FIGURE 1 is a perspective view of the present training apparatus showing the equipment fully enclosed by a transparent enclosure except for keyboard of the typewriter mechanism;

FIGURE 3 is a view of the keyboard of the typewriter of this training apparatus;

FIGURE 4 is a side view of the key lever, cam, bell crank and type bar mechanism of the typewriter;

Figure 2:
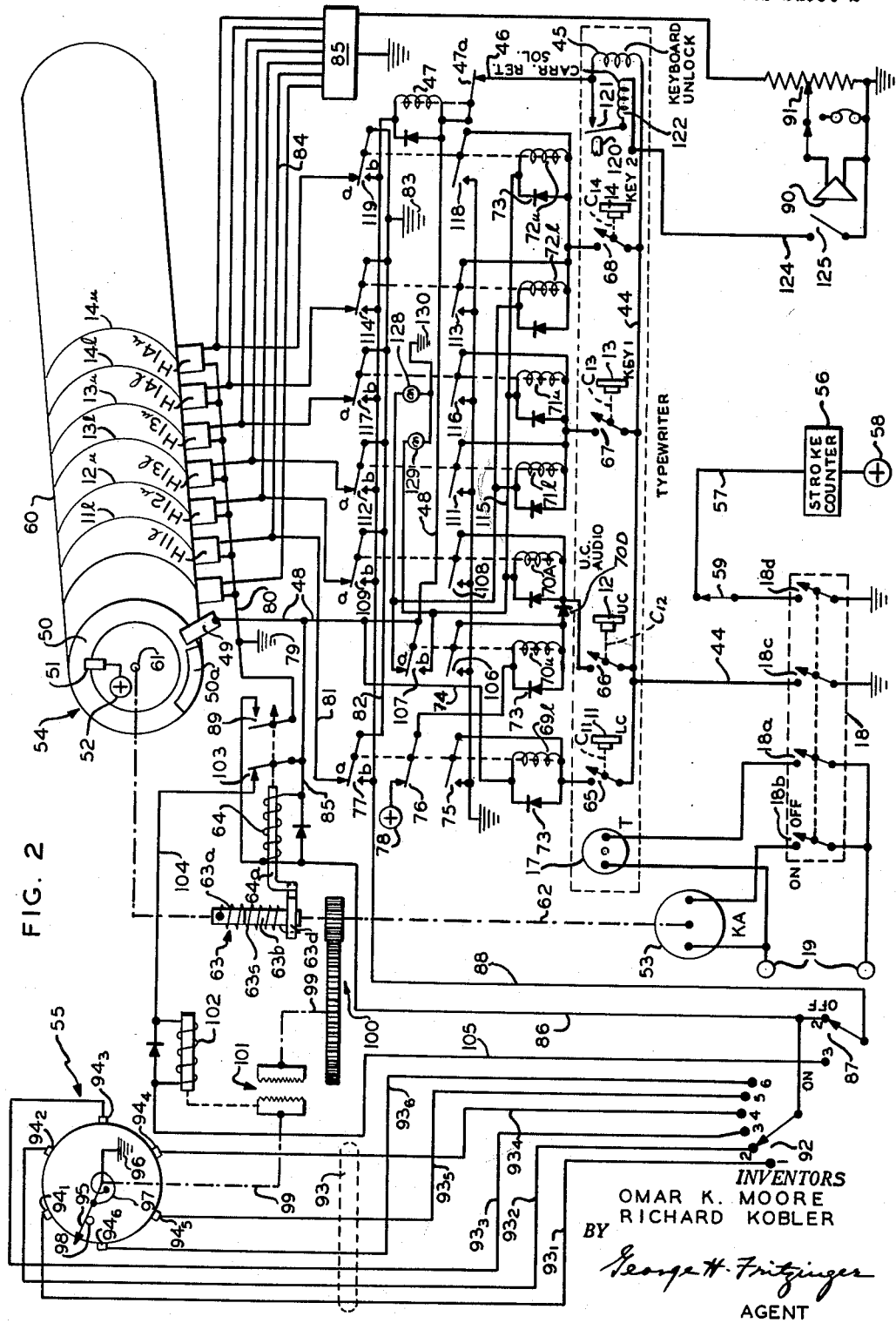
FIGURE 2 is a schematic circuit diagram of the present training apparatus.

The present training apparatus comprises a special form of electric typewriter the basic mechanism of which may be that of an electric writing machine known as a "Flexowriter" and made by Friden, Incorporated of San Leandro, California. The keyboard may comprise a total of fifty-two keys representing letters, numbers, punctuation marks, etc., as shown for example by the chart in FIGURE 3. The arrangement of the letters of the alphabet keys is preferably standard but the arrangement of the characters represented by the remaining keys may be selected according to any desired pattern. The keys are arranged in four horizontal rows at successively lower levels proceeding from the back to the front as indicated in FIGURE 4. Ahead of the front row of the keys is a space bar 10. At opposite ends of the third and fourth rows are upper-case and lower-case shift keys 12 and 11. A complete understanding of the operation of the entire keyboard will be understood from a description of the operation of the system when there is operated a lower-case shift key 11, an upper-case shift 12, a key 13 from one of the back two rows and a key 14 from one of the front two rows; and therefore to simplify the description the system is shown in FIGURE 2 as including only these four keys.

The keys 13 and 14 control respective type bars 15 and 16 (FIGURE 4) through apparatus which is power-driven by a motor 17 (FIGURE 2). When the user throws an on-off multiple switch 18 to "on" position a section 18a of the switch is closed to connect the motor 17 across a power supply designated by a pair of terminals 19, and a section 18c is closed to complete ground connection for the typewriter circuits. The motor 17 drives a power roll 20. When a key of the first or second rows is depressed it brings a respective cam unit at the rear of the power roll in engagement therewith, and when a key of the third or fourth rows is depressed it brings a respective cam unit at the front of the power roll in engagement therewith. This is illustrated with respect to key 14 in FIGURE 4. For example, upon depressing key 14 key lever 21 is turned about pivot 22 to turn a release lever 23 counterclockwise about pivot 24 on a front cam unit $C_{14}$ pivoted to the frame at 26. The release lever 23 resembles a finger having two turned-over lips 23a and 23b. These lips are positioned for engaging respective side lugs 27a and 27b on a two-lobe cam 27 journaled at 28 to the cam unit. Lip 23a engages the lug 27a to hold the cam in a normal position and is disengaged therefrom when the release lever is turned counterclockwise. When this disengagement occurs the lip 23b assumes a position to engage the next oncoming lug 27b of the cam provided the key 14 is held depressed. At the instant the lip 23a is disengaged from the cam the latter is turned slightly counterclockwise by a cantilever spring 29 bearing against one of two diametrically opposite side pins 29a on the cam. By this initial movement of the cam the adjacent one of the two serrated surfaces thereof is brought into contact with the power roll to cause the cam to be turned about 180°. This moves one of the high lobes of the cam past the power roll and shifts the whole cam unit $C_{14}$ counterclockwise about the pivot 26 to impart through a link 30 an impulse movement to a bell crank lever 31 which in turn imparts through a link 32 an impulse movement to the respective type bar 16 thereby causing the type bar to be struck once against the platen 34.

If the child holds the key 14 depressed for a moment or longer the cam 27 is stopped short of one-half revolution by the lug 27b striking the lip 23b of the release lever, but when the key 14 is released the release lever is turned clockwise to disengage the lip 23b from the lug 27b and allow the cam to be moved ahead under influence of the bias spring 29 to its normal position defined by engagement of the lip 23a with the lug 27a. Thus, whether the key 14 is depressed only slightly or fully, and whether it is promptly released or held down for a moment or longer the respective type bar is struck only once against the platen and always with the same force. This assures that only one character is printed responsive to each operation of a key of the keyboard.

Figure 5:
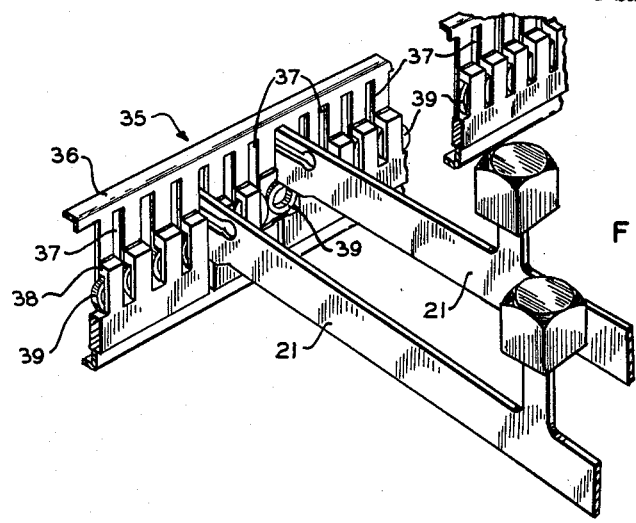
FIGURE 5 is a perspective view of the key lever interlock.

Another feature of the typewriter which is important to the present training apparatus but which is standard and need therefore not be described in detail is a key lever interlock 35 illustrated in FIGURE 5. This interlock is a mechanical means which permits only one key of the keyboard to be depressed at a time. The interlock comprises a guide comb 36 having slots 37 through which pass the respective key levers. In the comb below the normal positions of the key levers is a raceway 38 in which there is a series of rollers 39 of a number less by one than the number of the key levers. The rollers fall short of fully spanning the length of the raceway by the width of a single key lever. When a key lever is depressed it will cam the adjacent rollers apart if need be and move therebetween, and in so doing the raceway is filled to block any second key lever from being depressed until the prior key lever is released. The arrangement of the rollers and raceway is such that a first key must be depressed sufficiently to operate the respective type bar before this interlock takes place and having taken place no second lever can be depressed sufficiently to operate its respective type bar.

Figure 6:
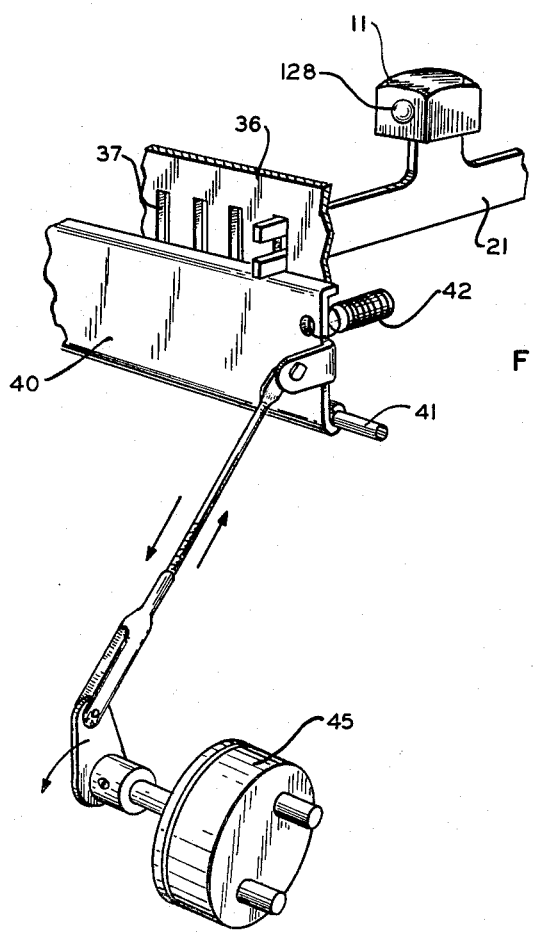
FIGURE 6 is a view of the electromechanical keyboard lock mechanism of the typewriter.

A novel feature incorporated in the typewriter and important to the present training apparatus is an electromechanical lock for the entire keyboard. As will appear, this lock mechanism prevents any further operation of the keyboard even though the depressed key is immediately released until after certain timed functions are completed. This keyboard lock mechanism comprises a bail 40 pivoted at 41 to the ends of the front guide comb 36, as shown in FIGURE 6. The bail is biased by a spring 42 into an upright position below the front portion of the key levers to block the operation thereof. When the on-off switch 18 of the machine is thrown to "on" position ground connection is completed to a lead 44 to cause activation of an unlocking solenoid 45 via lead 46, normally closed switch 47a of relay 47, lead 48, brush 49, commutator 50, brush 51 and plus terminal 52 of a D.C. power source. Activation of the solenoid 45 propels the locking bail into an inoperative position freeing each of the key levers. However, as will appear, upon depressing any one of the key levers the relay 47 is activated to open the switch 47a and drop out the unlocking solenoid 45. The locking bail is then drawn by spring 42 against the end of the operated key lever and will snap thereunder the instant the key lever is released to lock all of the key levers in their unoperated positions. All of the key levers remain so locked until the solenoid 47 is again dropped out to activate the unlocking solenoid 45.

An additional function performed when the on-off switch 18 is thrown to "on" position is in closing a switch section 18b to start a drive motor 53 for a phonographic reproducing mechanism 54 and an advance clutch timing mechanism 55. Still further, operation of the switch 18 to "on" position closes a switch section 18d to prepare a stroke counter 56 for operation. The stroke counter is connected in a circuit running from plus terminal 58 to ground through a switch 59 operated once by each depression of a key of the keyboard of the typewriter.

The phonographic reproducing mechanism may comprise a drum 60 rotatable about a center axis 61. The drum has preferably a magnetizable recording surface bearing as many recorded one-revolution tracks as there are characters of both lower and upper case represented by the keyboard. These tracks bear recordations of the pronunciation of the respective characters. Each character is pronounced by bringing a magnetic reproducing head in active registration with the selective track and then rotating the drum through one revolution responsive to each operation of the keyboard. To simplify the description, a magnetic reproducing head is shown for each track. Thus, for the four keys above-mentioned, there is a recorded track 11L for the lower case shift key 11, a track 12U for upper case shift key 12, and there are recorded tracks 13L and 13U for the key 13 and recorded tracks 14L and 14U for the key 14. In registration with these respective tracks are magnetic heads represented by the letter H with the sub designation of the respective track. To permit the necessary juxtaposition of the successive tracks the heads would be staggered about the periphery of the drum and likewise the starting points of the recorded tracks would be staggered so that each head would be at the beginning of the respective track when the drum is in its home position. In practice, however, it is preferable to use a single head with mechanism to shift it quickly into registration with a selected track responsive to depressing a respective key.

A drive coupling 62 is provided between the motor 53 and the drum 60. This coupling 62 includes a one-revolution clutch 63 between two axially aligned shafts 63a and 63b. The clutch includes a helical spring 63s secured at one end to the shaft 63a and at the other end to a dog 63d freely rotatable on the shaft 63b. The dog canbe latched against rotation by an armature 64a of a solenoid 64. When the dog is so latched the rotating shaft 63b tends by frictional contact with the spring to unwind the portion thereof surrounding the shaft 63b and the shaft 63a remains at standstill, but when the dog is released the portion of the spring surrounding the shaft 63b grips the same responsive to its natural resilience and to the tightening action imparted by the driving resistance of the shaft 63a whereby to clutch the shaft 63a to the shaft 63b. After the dog is so released a drop out of the solenoid during the ensuing revolution of the drive shafts will disengage the clutch only at the end of that revolution. Such single revolution of rotation of the drum together with a selective preparation of a respective magnetic head is carried out responsive to depressing each key as is herein next described.

As shown in FIGURE 2 there are respective key lever switches 65 to 68 associated with the keys 11 to 14. When a key is depressed to operate momentarily the respective cam unit C a respective key lever switch 65 to 68 is operated momentarily by this cam unit. The key lever switch 65 associated with the lower case shift key 11 is connected between the ground lead 44 and a respective lower case relay 69L. The key lever switch 66 associated with the upper case shift key 12 is is connected directly between this same ground lead 44 and an upper case audio relay 70A and through a diode 70D to an upper-case lock relay 70U. Each of the remaining key lever switches is connected directly between the ground lead 44 and a pair of relays one of which is a lower-case relay and the other an upper-case relay. Thus, for example, the key lever switch 67 associated with the 13 is connected between ground lead 44 and relays 71L and 71U, and the key lever switch 68 associated with the key 13 is connected between ground lead 44 and relays 72L and 72U. Each of these relays is shunted by a diode 73 to provide a slight delay in the drop out of the relay when the circuit is broken the advantage of which is to assure a more positive operation of the relays.

Assume that the machine is in a condition to print the lower case characters. If the student wants to print upper case characters he must first press the upper-case shift key 12 and having so pressed the upper-case shift key the apparatus will remain in condition to print only upper-case characters until the lower case shift key 11 is again pressed. Upon pressing the lower case shift key 11 the machine pronounces "lower case" and upon pressing the upper case shift key 12 the machine pronounces "upper case" regardless of the prior setting of the keyboard.

When the lower case shift key 11 is pressed the relay 69L is activated from the ground lead 44 via lead 74, lead 48, brush commutator 49—51 and plus terminal 52. Activation of the relay 69L closes a switch 75, opens a switch 76 and shifts a switch 77 from its "a" to "b" contact. The closing of switch 75 provides a ground connection for the relay independently of the key lever switch 65 and thus causes the relay to be held operated after the key lever switch is released. The opening of the switch 76 disconnects the upper case lock relay 70U from its plus terminal 78 to prevent activation of this relay while the lower case relay 69L is activated. When the switch 77 is in its unoperated "a" position it provides a short across the lower case magnetic head $H_{11}L$ running from ground 79 via lead 80, head $H_{11}L$, lead 81, switch 77 at its "a" contact, and lead 82 to ground 83. However, the throw of switch 77 from its "a" to its "b" contacts responsive to the activation of the relay 69L accomplishes three functions: (1) it removes the short or mute circuit from the head $H_{11}L$ causing the head to be operatively connected from ground 79 via lead 84 the input of an amplifier 85; (2) it completes the circuit of the drum clutch solenoid 64 from plus terminal 52 via commutator 50—49, lead 48, lead 85, solenoid 64, lead 86, on-off timer switch 87 at its "off" position, lead 88, relay switch 77 at its "b" contact and lead 82 to ground 83; and (3) it activates the relay 47 from the lead 48 through switch 77 at its "b" contact to ground 83, thereby dropping out the unlocking solenoid 45 and preparing the keyboard locking mechanism to lock the entire keyboard the instant the depressed key 11 is released. The activation of the drum clutch solenoid 64 closes a switch 89 to complete a hold circuit to ground 79 for the solenoid, and it releases the dog 63d to engage the clutch and start rotating the drum 60. As the drum is advanced the head $H_{11}L$ picks up the recorded signal on the track 11L and feeds it through the amplifier 85 to a speaker 90 to cause the machine to pronounce automatically the phrase "lower case." By adjustment of a volume control 91 the automatic pronunciation can be set to any desired volume level or can be faded out as desired. The automatic pronunciation is completed in about three-quarter turn of the drum. As the drum enters the last one-quarter turn the brush 49 rides momentarily off the commutator segment 50 and onto an insulator segment 50a to disconnect the power supply. This momentary disconnection drops out the drum clutch solenoid 64 to return its armature into a blocking position relative to the dog 63d whereby to stop the drum after one full revolution of movement. Furthermore, the momentary disconnection of the power supply drops out the lower case relays 69L to perform the following functions: (1) to open the hold-circuit switch 75, (2) reclose the switch 76 to make power available again to the upper case relaly 70U, (3) to open switch 77 at its "b" contact to prevent reoperation of the lock control relay 47 and of the drum clutch solenoid 64 when the commutator 49—51 recloses at the completion of the revolution of movement of the drum, and (4) it closes the switch 77 at its "a" contact to restore the mute circuit on the head $H_{11}L$. The dropping out of the relay 47 reactivates the unlocking solenoid 45 to unlock the keyboard for selective operation of any one of the keys. The use of a jamproof keyboard and of automatic restoration of the machine after a character is pronounced limits the machine to a single pronunciation responsive to each depression of a key.

If the operator throws the time switch 87 to "on" position the automatic pronunciation is delayed after a key is depressed for an interval determined by the setting of the manual set switch 92. This delay is for the purpose of giving the child a time interval in which to attempt the pronunciation of the selected character before he receives the correct automatic pronunciation. Certain functions occur when a key is depressed while the on-off time switch is in "on" position the same as when this switch is in "off" position. For instance, upon depressing the lower case shift key 11 the following same actions occur regardless of the setting of the on-off time switch: (1) the relay 69L is operated and locked in by the hold-circuit switch 75, (2) power is removed from the upper case lock relay 70U, (3) the relay 47 is actuated to restore the keyboard lock, and (4) the mute circuit for the magnetic head $H_{11}L$ is removed. However, the power supply circuit for the drum clutch solenoid 64 is at first broken to delay the start of rotation of the drum 60. For instance, instead of the power circuit being completed to ground through the on-off switch 87 in its "off" position it is now completed through the manual set switch 92 and through the advance clutch switch 55, the exact circuit running through a lead of a cable 93 depending on the setting of the manual switch 92, a corresponding one of a set of terminals 94 of the advance clutch switch 55 and a pole 95 of this switch to ground 96. The pole member 95 is rotatably mounted and normally held in home position by a torsion spring 97 against a stop member 98. The pole has a drive connection to the motor 53 through a step-down gearing 100 and an advance clutch 101. The advance clutch 101 is normally disengaged but is engageable by activation of an advance clutch solenoid 102. When the drum clutch solenoid 64 is not operated and the on-off timing switch 87 is in "on" position, power is supplied to the advance clutch solenoid 102 the instant the key 11 is depressed. This power circuit for the advance clutch solenoid runs from the plus terminal 52 through the commutator 49—51, leads 48 and 85, switch 103 of the drum clutch solenoid 64, lead 104, advance clutch solenoid 102, lead 105, on-off timer switch 87 at its "on" contact, lead 88, switch 77 at its "b" contact and lead 82 to ground 83. Activation of the advance clutch to solenoid 102 starts rotating the switch pole 95 from home position at a rate of one second per terminal interval. Thus, if the manual set switch 92 is in its number "2" position, the pole 95 will reach the corresponding terminal $94_2$ of the advance clutch switch 55 in two seconds to complete a power circuit for the drum clutch solenoid 64 from the lead 86 via the switch 92 at its number "2" position, lead $93_2$ of the cable 93, terminal $94_2$ of the advance clutch switch 55, pole 95 and ground 96. The resultant operation of the drum clutch solenoid 64 opens the switch 103 to drop out the advance clutch 101 and cause an immediate snap back of the advance clutch switch 55 to home position, and it closes the switch 89 to provide a hold circuit for the drum clutch solenoid 64; additionally, the drum clutch solenoid releases the dog 63d to start rotation of the drum 60. When the drum enters into about the last fourth of its revolution of movement the power supply to the drum clutch solenoid 64 and to the lower case relay 69L is broken to restore the machine to its start condition, the same as is hereinbefore described when the key 11 is pressed with the on-off timer switch 87 in "off" position. Since the keyboard unlock solenoid 45 is deenergized from the instant a key is depressed until the respective character is pronounced the keyboard is blocked against any subsequent key being depressed throughout both the delay and pronunciation periods.

If the child presses the upper-case shift key 12 the switch 66 is closed momentarily by the respective cam unit C to cause the upper case lock relay 70U to be activated from the plus terminal 78 through switch 76, diode 70D and switch 66. Activation of the relay 70U closes the hold-circuit switch 106 to keep the relay 70U operated after the switch 66 is released and it throws the switch 107 from its "a" to its "b" contact. The opening of the switch 107 at its "a" contact removes power from all of the lower case relays associated with the other keys of the keyboard. This is shown, for example, in FIGURE 2 by the removal of the power from the relay 71L of the key 13 and from the relay 72L of the key 14. The closing of the switch 107 at its "b" contact occurs before key switch 66 is opened to activate the audio upper case relay 70A and it makes power available from the plus terminal 52 to all of the upper-case relays of the other keys as, for example, to the relay 71U of key 13 and to the relay 72U of the key 14. The activation of the audio relay 70A closes its hold circuit switch 108 to maintain the relay 70A operated after the key switch 66 is opened and shifts the switch 109 from its "a" to its "b" contact. The switch 109 parallels the switch 77 of the lower case relay 69L and has analogous functions. For instance, the breaking of switch 109 at its "a" contact removes the mute circuit from the respective head $H_{12}U$, and the closing of this switch at its "b" contact activates the drive system to start either immediately or with a preset delay the rotation of the drum, depending on whether the on-off timer switch 87 is in "off" or "on" position. The rotation of the drum causes the head $H_{12}U$ to pick up the signals on the track 12U and feed them through the amplifier 85 to the speaker 90 so that the machine pronounces automatically the phrase "upper case" responsive to depressing the upper case key 12.

At the end of the pronunciation "upper case" the upper-case audio relay 70A is dropped out by the interruption of the power supply by the commutator 49—51. As the relay 70A is dropped out is loses its ground connection since hold switch 108 is now open and the diode 70D is poled to prevent activation of the relay 70A through the hold switch 106 of relay 70U to ground. The upper-case lock relay 70U is however held operated through its hold circuit. Thus, upon subsequently pressing any of the other keys the machine will pronounce the upper-case characters associated with those keys. This upper-case condition remains until the pupil again presses the lower-case shift key 11 to open the switch 76 and drop out the upper-case lock relay 70U. When the pupil next presses the lower-case shift key 11 the lower-case relay 69L is activated to drop out the upper-case lock relay 70U, and after the machine has pronounced "lower case" the commutator 49—51 interrupts the power supply to return the lower-case relay 69 to unoperated position.

If the child presses the key 13 after having last pressed the lower-case shift key 11 of the two lower and upper-case shift keys 11 and 12, the cam unit $C_{13}$ is activated to cause the lower-case relay 71L to be activated from the plus terminal 52 through the commutator 49—51, lead 48, switch 107 at its "a" contact, lead 110, key lever switch 67 and ground lead 44. Operation of the lower case relay 71L closes that hold circuit switch 111 to provide a ground connection to the relay independently of the key lever switch 67, and it opens a switch 112 at its "a" contact and closes the switch at its "b" contact. The switch 112 parallels the switches 77 and 109 and has the same functions. For instance, the breaking of switch 112 at its "a" contact removes a mute circuit from the head $H_{13}L$, and the making of switch 112 at its "b" contact completes a ground connection for the power supply from terminal 52 through the keyboard lock control relay 47 to cause the keyboard to be locked the instant the key 13 is released. Furthermore, the making of switch 112 at its "b" contact grounds the lead 88 to cause the drum clutch solenoid 64 to be activated immediately if the on-off timer switch 87 is in "off" position. On the other hand, if this timer switch is in "on" position the activation of the drum clutch solenoid is delayed by an amount according to the positioning of the manual set switch 92, all as has been heretofore described when either of the keys 11 and 12 are pressed. Activation of the drum clutch solenoid 64 starts the drum 60 through one revolution of movement to reproduce the recording in the track 13L causing the machine therefore to pronounce the lower-case character represented by the key 13. Again, during the final rotation of the drum through its single revolution of movement the power circuit is broken by the commutator 49—51, (1) to drop out the lock control relay 47 and enable again any of the keys to be depressed, (2) to drop out the drum clutch solenoid 64 to stop the rotation of the drum at the completion of one revolution of movement, and (3) to drop out the lower-case relay 71L whereby to remove the ground connection from the power circuit of the drum clutch solenoid 64, and to restore the mute circuit on the head $H_{13}L$.

If the child presses the key 14 after having last pressed the lower case shift key 11 of the lower and upper-case shift keys 11 and 12, the lower-case relay 72L is operated to close a hold switch 113 for the relay and to throw a switch 114 from its "a" to its "b" position. This operation of the switch 114 causes the following operations to occur: (1) the mute circuit from the head $H_{14}L$ to be removed, (2) the lock control relay 47 for the keyboard to be activated for causing the keyboard to become locked the instant the key 14 is released, and (3) a ground connection for the lead 88 to be completed either to start the drum immediately or with a preset delay depending on whether the on-off timer switch 87 is in "off" or in "on" position. The machine therefore pronounces the lower-case character represented by the key 14 and then is returned to the condition which it had before the key 14 was pressed.

If the child presses the key 13 after having last pressed the upper-case shift key 12 of the lower and upper-case shift keys 11 and 12, the upper-case relay 71U is activated from the plus terminal 52 through the commutator 49—51, lead 48, switch 107 at its "b" contact, lead 115, relay 71U, key lever switch 67 and ground lead 44. The activation of the relay 71U closes a hold circuit switch 116 and shifts a switch 117 from its "a" to its "b" contacts. This shift of the switch 117 causes the following operations to occur: (1) a mute circuit for the magnetic $H_{13}U$ to be removed, (2) the lock control relay 47 to be activated, and (3) the lead 88 to be grounded to start the drum rotation either immediately or with a preset delay depending upon whether the on-off timer switch 87 is in "off" or "on" positions. As before described the machine thus pronounces the upper-case character represented by the key 13 and then drops back to the condition which it had before the key 13 was pressed. Similarly, if the key 14 is pressed after the child has last pressed the upper-case shift key 12 of the lower and upper-case shift keys 11 and 12, the relay 72U is operated to close a hold circuit switch 118 therefor and to shift a switch 119 from its "a" to its "b" contacts to produce the following functions: (1) remove a mute circuit from the head $H_{14}U$, (2) activate the relay 47 to restore the keyboard lock when the key 14 is released, and (3) start the drum rotation either immediately or with a preset delay according to whether the on-off timer switch 87 is in "off" or "on" position. Therefore, responsive to so pressing the key 14 the machine pronounces automatically the upper case character represented by the key 14. As the drum completes its single revolution of movement the commutator 49—51 breaks the power supply to drop out the relays and restore the machine to the condition which it had before the key 14 was pressed.

Signal lights 128 and 129 are connected between ground 130 and the "a" and "b" contacts respectively of switch 107 to indicate whether the machine is in condition to print and pronounce lower or upper case characters. These lights are preferably mounted respectively in the lower and upper-case shift keys as shown for example by the location of light 128 in key 11 in FIGURE 6.

The machine may be set for either manual or automatic return of the carriage of the typewriter. Automatic return is initiated by an adjustable finger 120 on the carriage engaging an end switch 121 to close the same when the carriage reaches a preset point near the end of its travel. The closing of the end switch 121 prepares a circuit for a carriage return solenoid 122 running from the plus terminal 52 via commutator 49—51, lead 48, switch 47a, switch 121, solenoid 122, lead 124 and a carriage return on-off switch 125 to ground. The carriage return solenoid 122 releases directly the carriage return catch when the solenoid 122 is activated, but the solenoid 122 is not activated after the end switch is closed until the pronunciation of the character of the last depressed key is completed since it is not until then that the switch 47a is closed as before described. When the switch 125 is in "off" position the automatic carriage return is disabled. The child must then return the carriage by pressing the carriage-return key the effect of which is to activate the solenoid 122 by a separate circuit not herein necessary to show.

In order to speed up the child's dexterity in properly using the keyboard the keys which are to be operated by the left hand which are to the left of the dash dot line 126 in FIGURE 2—may be provided with a different feel and/or a different operating pressure than those to the right of the line 126 to be operated by the right hand. Such different feel may be provided by differently shaping the respective keys. The different operating pressure is obtainable by adjusting the tension of the return springs 25 for the key levers. Still further, a feel and/or operating pressure may be provided which is different for those keys to be operated by a certain finger of the hand from that which is provided for the keys to be operated by another finger of the same hand in order to guide the child in learning to use the right finger for each key.

From the foregoing description it will be apparent that the present training apparatus for children is one wherein the child is invited or stimulated to do a single selective act, in this case to select a single character by pressing the key representing the character, because in making this selection the child is pleasantly surprised to find that the machine responds by pronouncing the selected character. The child is therefore stimulated into pressing other keys and awaiting the pronunciation thereof. Soon the child will begin associating his visual impression of each character as it appears on the keyboard with the sound of the character as it is pronounced by the machine. By setting the machine to delay the pronunciation, the child will begin attempting his own pronunciation and comparing it with the correct automatic pronunciation. The child therefore learns to speak correctly the different sounds representing the different letters, numbers, etc., designated on the keys of the typewriter. Soon the child will begin exploring the lower and upper-case characters on the keyboard. Here he will learn that upper and lower-case letters have the same pronunciation but different appearance. From this he learns to recognize and read both lower and upper-case letters and the printing thereof. With only a little tutoring help he begins learning the different meaning of lower and upper-case letters and begins grouping letters and recognizing their printed forms as representing words. All the while the child is enforced to follow an orderly procedure since he has access only to the keyboard of the typewriter and the keyboard is jamproof so that he can press only one key at a time. After having pressed any selected key he must await the pronunciation thereof before he can explore any further character represented on the keyboard. In view of these limitations which enforce an orderly procedure in the use of the training apparatus, the child can proceed on his own with little or no guidance or help from a tutor and can progress in line with his own capabilities. This gives the child a new found freedom and an added stimulation to his learning processes, and has resulted in the child making phenomenal progress in developing his ability at a very early age to read, speak, spell, print and type.

The particular embodiment of our invention herein shown and described in detail is intended to be illustrative and not necessarily limitative of our invention since the same is subject to changes and modifications without departure from the scope of our invention, which we endeavor to express according to the following claims.

In the claims the phrase "locking the keyboard" is intended to include any disabling of the keyboard which prevents the user from either typing another character or restarting the reproducing machine to pronounce another character until the locking means is released.

We claim:

1. A self-training apparatus comprising a typewriter having a keyboard with characters designated on the respective keys, said keyboard comprising one group of keys adapted to be operated by the fingers of one hand and another group of keys to be operated by the fingers of the other hand, a typing bar for each of said keys, power means responsive to each selective depression of a key of the keyboard for providing a single-stroke actuation of a respective one of said typing bars, and means for enabling a student to distinguish between said key groups by the fingers of the hands comprising spring means biasing individually the keys of one group to their unoperated positions with a given force and other spring means biasing individually the keys of the other group to their unoperated positions by a substantially different force.

2. The self-training apparatus set forth in claim 1 including individual return springs for the respective keys of the keyboard wherein the tension of the springs associated with the keys to be operated by one finger of the hand is set differently from the tension of the springs of the keys to be operated by a different finger of the hand.

3. The self-training apparatus set forth in claim 1 wherein the keys of said one group have a feel which is different from that of the keys of the other group whereby to enable a student to distinguish more readily between the respective groups.

4. A self-training apparatus comprising a typewriter having a keyboard with characters designated on the respective keys, typing bars, means responsive to each selective depression of a key of said keyboard for providing a single-stroke actuation of a respective one of said typing bars and for locking all remaining keys of the keyboard until the depressed key is released, a sound reproducing machine including means selectively operable to pronounce the respective characters designated on said keyboard, means for starting said reproducing machine and causing the same to run for a predetermined time interval responsive to each operation of a key of said keyboard and means responsive to each selective operation of a key of said keyboard for conditioning said reproducing machine to pronounce within said predetermined time interval the character designated by the respective key.

5. The self-training apparatus set forth in claim 4 including means responsive to each key operation for locking the keyboard to prevent another key operation until expiration of the respective predetermined time interval.

6. The self-training apparatus set forth in claim 4 including means responsive to each key operation for limiting the pronunciation of a character by said reproducing machine to a single occurrence.

7. The self-training apparatus set forth in claim 4 wherein said reproducing machine comprises a reproducing head and a record medium having thereon a succession of tracks each bearing a recordation of a single one of said characters, said starting means including means adapted upon each operation to produce a movement between said reproducing head and record medium to pronounce a respective character, and said conditioning means including means for limiting the reproducing machine to the reproduction of only one track at a time.

8. A self-training apparatus comprising a typewriter having a keyboard with characters designated on the respective keys, typing bars, means responsive to each selective depression of a key of the keyboard for providing a single-stroke actuation of a respective one of said typing bars, a sound reproducing machine having a record bearing a recordation of the pronunciation of each of the characters represented by said keyboard, means responsive to each operation of a key of said keyboard for starting said reproducing machine and conditioning the same to pronounce the character represented by the respective key, and timing means responsive to each operation of a key of the keyboard for locking the keyboard for a time interval until the pronunciation of the selected character is completed by the reproducing machine.

9. The self-training apparatus set forth in claim 8 including means shiftable into an "on" position for delaying the start of said reproducing machine following each depression of a key of the keyboard, and manually settable means for varying the extent of said delay.

10. The self-training apparatus set forth in claim 8 including means operative upon release of a depressed key prior to the completion of the pronunciation of the character designated by said key for locking the released key in unoperated position until said pronunciation is completed.

11. A self-training apparatus comprising a typewriter having a keyboard with characters designated on the respective keys thereof, typing bars, means responsive to each selective operation of a key of said keyboard for providing a stroke actuation of a respective one of said typing bars, a reproducing machine including a record medium bearing as many record tracks as there are character designations on said keys, said tracks recorded with the spoken pronunciation of said characters, and electromechanical means responsive to pressing a key of said keyboard for starting said reproducing machine in a selected condition to reproduce the respective recorded track and pronounce the character designated on the selected key as the character is typed.

12. A self-training apparatus comprising a typewriter keyboard having lower case and upper case characters designated on the respective keys and having separate lower case and upper case selector keys, a reproducing machine including a record medium bearing as many record tracks as there are lower and upper case designations on said keys, said tracks being recorded with the spoken pronunciation of said characters, a pair of relays controlled by each of said keys, one of each of said pairs of relays being activatable to start said machine in a selected condition to reproduce the lower case designation of the respective key and the other of each of said pairs of relays being activatable to start said machine in a selected condition to reproduce the upper case designation of the respective key, means responsive to pressing said lower case selector key for preparing said one of each of said pairs of relays for activation when the respective key is pressed, and means responsive to pressing said upper case selector key for preparing said other of each of said pairs of relays for activation when the respective key is pressed.

13. The self-training apparatus set forth in claim 12 including means operated upon completion of the pronunciation of each of said characters for interrupting the power supply to the operated one of said relays and dropping out the relay to restore the machine to the condition which it had before the last selected key was depressed.

References Cited in the file of this patent

UNITED STATES PATENTS

| | | |
|---|---|---|
| 1,777,055 | Thompson | Sept. 30, 1930 |
| 2,255,030 | Tholstrup | Sept. 2, 1941 |
| 2,547,603 | Segal et al. | Apr. 3, 1951 |
| 2,581,218 | Thompson | Jan. 1, 1952 |
| 2,938,618 | Niccolls | May 31, 1960 |
| 2,962,819 | Kerridge | Dec. 6, 1960 |